June 7, 1932.   H. J. BURNISH   1,862,296
ROTARY CONTACT ROLL FOR ELECTRIC WELDING MACHINES
Filed Sept. 10, 1931
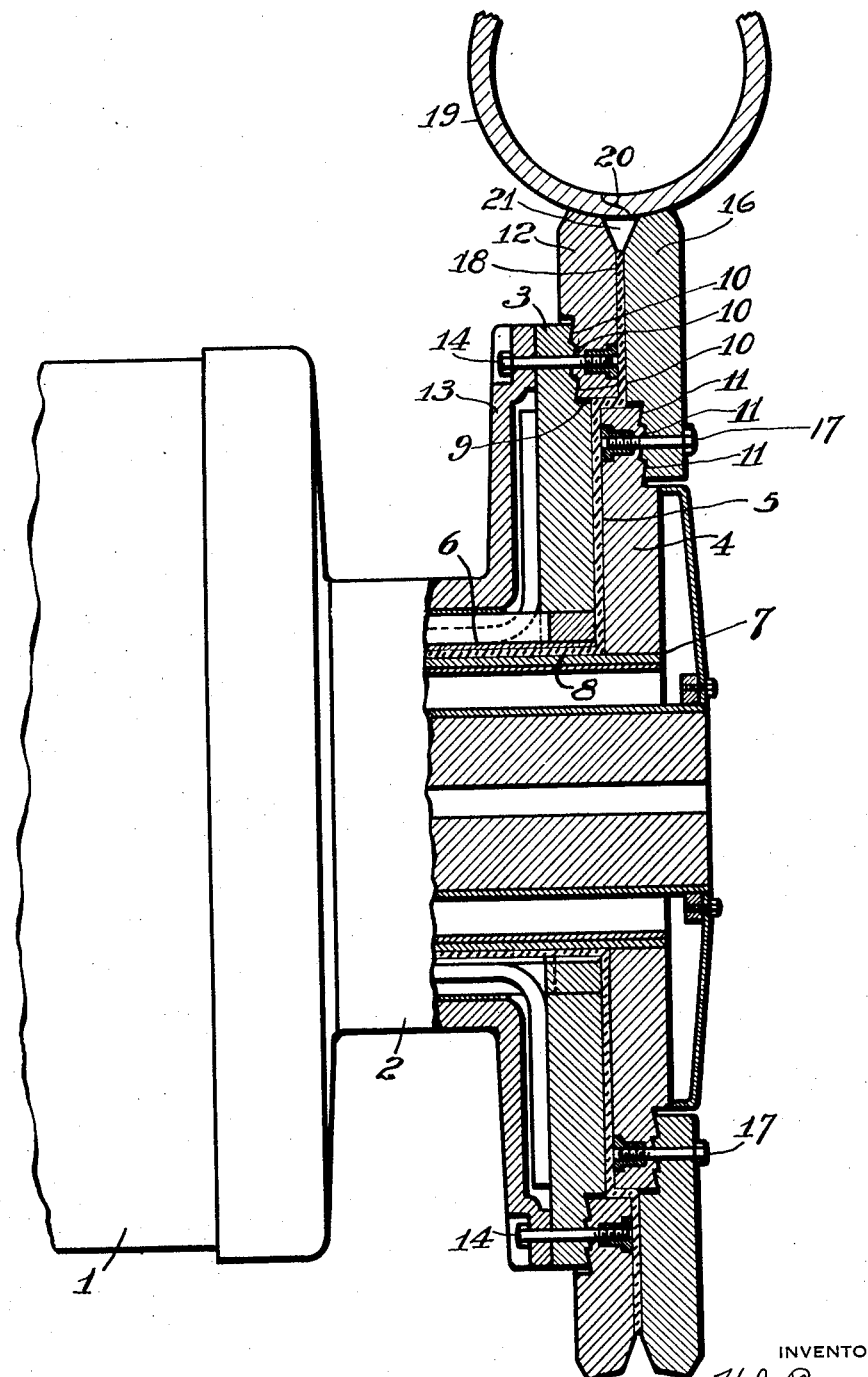
INVENTOR
H. J. Burnish
by F. N. Barker
attorney Patented June 7, 1932　　　　　　　　　　　　　　1,862,296

UNITED STATES PATENT OFFICE

HOWARD J. BURNISH, OF SEWICKLEY, PENNSYLVANIA, ASSIGNOR TO SPANG, CHALFANT & COMPANY, INC., OF PITTSBURGH, PENNSYLVANIA, A CORPORATION OF PENNSYLVANIA

ROTARY CONTACT ROLL FOR ELECTRIC WELDING MACHINES

Application filed September 10, 1931. Serial No. 562,079.

My invention relates to rotary contact rolls for electric welding machines.

It is one object of this invention to provide against any tendency to reduce the electrical contacts between the contact rings forming the peripheral part of the contact roll and those portions of the roll to which the rings are attached. In the contact-ring type of welding, the rings are heated at a higher temperature than the core of the roll which carries the rings. This together with the fact that the rings are made of copper or the like which has a higher coefficient of expansion than the core upon which they are mounted tends to break or loosen the electrical contact between the rings and the core unless special provision is made against this tendency, which this invention avoids. Other objects appear hereinafter.

The accompanying drawing shows in side elevation one end portion of a rotary transformer to which an electric welding roll shown in central longitudinal section is attached.

The rotary transformer 1 has the journal 2, it being understood that the left-hand or broken-away portion of the transformer will also have a suitable journal. The construction of the transformer forms no part of this invention and is therefore not shown completely or in details. This invention relates more particularly to the manner of mounting the welding rings or annular contacts on the rotating electrode cores.

The transformer has secured thereto in any suitable manner the two annular concentric cores 3 and 4 insulated from each other by the annular insulating rings 5, the supporting members 6 and 7 being separated by the tubular insulation 8. The outer core 4 has a smaller diameter than the inner core 3.

The outer face of the core 3 is annularly recessed from its periphery towards its axis of rotation, the recess terminating radially at the annular or peripheral shoulder 9 while the lateral face of the recess is provided with a number of annular ribs 10 with their lateral faces inclined outwardly toward the periphery of the core 3 and laterally toward the recess.

The outer face of the core 4 is also annularly recessed the same as the core 3 and has annular ribs 11 having the same characteristics as the ribs 10.

The welding ring or annular contact or electrode 12 has a series of annular ribs corresponding in shape to the ribs 10 and fitted to make electrical contact and register with the ribs 10 on the core 3, the ring being secured to the flange 13 at the outer end of the bearing 2 by bolts 14.

The welding ring or annular contact or electrode 16 has a series of annular ribs corresponding in shape to the ribs 11 and fitted to make electrical contact and register with the ribs 11. The ring 16 is secured to the core 4 by bolts 17.

The welding rings are separated from each other by the ring 18 of insulation. There is also a ring of insulation joining the rings of insulation 5 and 18.

The peripheries of the welding ring are curved to conform to the peripheral surface of the pipe 19 whose edges meet at the joint 20 which lies opposite the annular V-shaped space 21 between the opposed faces of the welding rings at the periphery of the welding roll.

The ring 16 may be readily slipped off axially from the core 4 for replacement or repair after the bolt fastenings 17 have been removed and similarly the ring 12 may be slid off axially from the core 3 after the bolt fastenings 14 have been removed. As the core 4 is smaller than the core 3, and as the central opening in the ring 12 is larger than the core 4, the rings 12 and 16 can both be slid in the same direction away from their cores.

Current for welding is fed through the cores and across the joints between them and the welding rings and across the seam 20 in a manner well understood by those acquainted with the art of welding tubes. The current heats the rings to a higher temperature than the cores are heated. The rings tend to expand and open the joints between the rings and the cores. Furthermore, the heat may lengthen the bolts 14 and 17 slightly so as to tend to impair the contacting surfaces between the cores and the rings. However, with my invention any expansion of the rings radially causes the interlocking ribs on the rings and cores to increase the pressure between them and so maintain or increase the electrical conductivity between them.

I claim—

1. In an electric welding apparatus, a rotary element, two cores rotatable therewith and arranged in axial alinement therewith and insulated from each other, and an annular welding ring carried by each core and concentric therewith, the axial opening in one ring being sufficiently large to permit it to pass to its core by lateral movement over the core for the other welding ring.

2. In an electric welding apparatus, a rotary element, two current-carrying cores rotatable therewith and arranged in axial alinement and insulated from each other, and an annular welding ring carried by each core and concentric therewith, a lateral face of each core contacting with and fitting a lateral face of its companion welding ring and the mutually contacting faces being inclined laterally and also outwardly toward the periphery of the roll, and means for clamping each ring to its core.

3. In an electric welding apparatus, a welding roll for tube welding machines containing two axially-alined cores insulated from each other, an annular contacting element detachably mounted on each core, the central opening in one element being larger than the diameter of the core for the other element whereby the element with the larger opening may be passed over the core for the other element on its way to its seat on the larger core.

4. In an electric welding apparatus, a rotatable shaft, two cores rotatable therewith and at right angles therewith, the outer core having the smaller diameter, and a detachable welding ring on the periphery of each core.

5. In an electric welding apparatus, a welding roll having a current-carrying core, and a welding ring having a lateral face clamped to a lateral face of the core, the contacting faces of the core and the ring being inclined laterally and outwardly toward the periphery of the roll, whereby the expansion of the ring increases the pressure between the said faces.

In testimony whereof, I hereunto affix my signature.

HOWARD J. BURNISH.